United States Patent
Zeng et al.

(10) Patent No.: US 11,789,135 B2
(45) Date of Patent: Oct. 17, 2023

(54) ULTRA-WIDEBAND INTELLIGENT SENSING SYSTEM AND METHOD FOR CAR STATES DETECTION

(71) Applicant: Robert Bosch GmbH, Stuttgart (DE)

(72) Inventors: Yunze Zeng, San Jose, CA (US); Avinash Kalyanaraman, Charlottesville, VA (US); Sushanta Mohan Rakshit, Santa Clara, CA (US); Vivek Jain, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 921 days.

(21) Appl. No.: 16/368,994

(22) Filed: Mar. 29, 2019

(65) Prior Publication Data

US 2020/0309932 A1 Oct. 1, 2020

(51) Int. Cl.
*G01S 13/02* (2006.01)
*G06N 20/00* (2019.01)
(Continued)

(52) U.S. Cl.
CPC .......... *G01S 13/0209* (2013.01); *B60R 25/24* (2013.01); *G01S 7/41* (2013.01);
(Continued)

(58) Field of Classification Search
CPC ...... G01S 13/0209; G01S 7/41; G01S 13/003; G01S 13/04; B60R 25/24; G06N 20/00;
(Continued)

(56) References Cited

U.S. PATENT DOCUMENTS

| | | |
|---|---|---|
| 4,942,393 A | 7/1990 | Waraksa et al. |
| 6,100,792 A | 8/2000 | Ogino et al. |

(Continued)

OTHER PUBLICATIONS

Mar, J.; Ultra-wide bandwidth in-vehicle channel measurements using chirp pulse sounding signal; 2009; Published in IET Science, Measurement and Technology; doi: 10.1049/iet-smt.2008.0129; pp. 271-278 (Year: 2009).*

(Continued)

*Primary Examiner* — Timothy A Brainard
*Assistant Examiner* — Juliana Cross
(74) *Attorney, Agent, or Firm* — Brooks Kushman P.C.

(57) ABSTRACT

A system and method is disclosed for determining a particular vehicle state based on a UWB signal received at a plurality of receiving nodes. A plurality of channel-impulse responses (CIRs) may be computed from the UWB signal received from the plurality of receiving nodes. A plurality of peak-based features based on a selected position and amplitude may be extracted from the plurality of CIRs. A plurality of correlation-based features may be generated by correlating the plurality of CIRs to a corpus of reference CIRs relating to a plurality of vehicle states. A plurality of maximum likelihood vehicle matrices may be generated by correlating the plurality of CIRs to the corpus of reference CIRs relating to the plurality of vehicle states. The vehicle state may then be determined by processing the plurality of peak-based features and correlation-based features using the machine learning classification algorithm.

20 Claims, 14 Drawing Sheets

(51) Int. Cl.
  *B60R 25/24* (2013.01)
  *G01S 7/41* (2006.01)
  *G01S 13/00* (2006.01)
  *G01S 13/04* (2006.01)
(52) U.S. Cl.
  CPC ............ *G01S 13/003* (2013.01); *G01S 13/04* (2013.01); *G06N 20/00* (2019.01)
(58) Field of Classification Search
  CPC .. G07C 9/00309; G07C 2209/63; G07C 5/08; H01Q 1/3241; H01Q 5/25
  See application file for complete search history.

(56) References Cited

U.S. PATENT DOCUMENTS

| | | | |
|---|---|---|---|
| 7,577,446 B2 | 8/2009 | Guvenc et al. | |
| 8,930,045 B2 | 1/2015 | Oman et al. | |
| 9,755,797 B2 | 9/2017 | Wu et al. | |
| 10,083,556 B1 | 9/2018 | Jain et al. | |
| 10,573,104 B2 | 2/2020 | Jain et al. | |
| 2003/0232612 A1* | 12/2003 | Richards | H04B 1/71637 455/323 |
| 2009/0015460 A1* | 1/2009 | Fox | G01S 13/886 342/53 |
| 2015/0282112 A1* | 10/2015 | Bialer | H04L 45/24 455/456.1 |
| 2016/0259032 A1* | 9/2016 | Hehn | G01S 5/0289 |
| 2018/0018579 A1* | 1/2018 | Xu | G06N 20/00 |
| 2018/0234797 A1 | 8/2018 | Ledvina et al. | |
| 2018/0265039 A1 | 9/2018 | Jain et al. | |
| 2018/0268629 A1 | 9/2018 | Jain et al. | |
| 2020/0333449 A1* | 10/2020 | Cho | G01S 7/2921 |

OTHER PUBLICATIONS

DW1000 User Manual, v2.11, 2017, Decawave Ltd., 242 Pages (split into 3 parts, per file name, to meet size requirements).
Decawave Application Note, "APS006 Part3: DW1000 Metrics for Estimation of Non Line Of Sight Operating Conditions," v1.0, 2016, Decawave Ltd., 19 Pages.
Wikipedia, "Random forest," url: https://en.wikipedia.org/wiki/Random_forest, accessed Jun. 17, 2021, 12 Pages.
U.S. Appl. No. 16/042,397, filed Jul. 23, 2018, 64 Pages.
Murray, A. M., "Part 11: Wireless LAN Medium Access Control (MAC) and Physical Layer (PHY) Specifications," IEEE Std 802.11-2016 (Revision of IEEE Std 802.11-2012), pp. 1-3532, Dec. 14, 2016, 3534 Pages (split into 15 parts, per file name, to meet size requirements).
"IEEE Standard for Low-Rate Wireless Networks," IEEE Std 802.15.4-2015 (Revision of IEEE Std 802.15.4-2011), pp. 1-707, Apr. 22, 2016, 708 Pages.
Viot, Mickael, "Automotive Security: Why UWB Measures Up," Embedded Systems Engineering Catalog, Sep. 30, 2014, pp. 6-10, https://www.decawave.com/automotive-security-why-uwb-measures-up-eecatalogue-us/, 6 Pages.
CAARESYS.com, url: https://caaresys.com/, accessed Apr. 4, 2019 (3 Pages).
"Driver vital sign detection demonstration using mmWave radar sensors," Texas Instruments Training & Videos, mmWave radar demonstrations, video 1.8, url: https://training.ti.com/driver-vital-sign-detection-demonstration-using-mmwave-radar-sensors?context=1135109-1139277-1135240, accessed Apr. 4, 2019 (2 Pages).
"Title 47—Telecommunication Chapter I—Federal Communications Commission—Subchapter A—General Part 15—Radio Frequency Devices," Electronic Code Of Federal Regulations (annual edition), published Oct. 1, 2018, url: https://www.govinfo.gov/app/collection/cfr/2018/title47/chapterI/subchapterA/part15, accessed Apr. 4, 2019 (120 Pages).

"Radino Spider RP-SMA Datasheet," In-Circuit GmbH, Published Mar. 19, 2015, Updated Jan. 26, 2019, Document-Nr: 305 000 086A, 3 Pages.
"Ultra-wideband Omni-directional Planar Antenna," In-Circuit GmbH 2019 Online Shop, Catalog item [902.055], url: https://shop.in-circuit.de/product_info.php?cPath=22_26&products_id=187, accessed Apr. 4, 2019, 1 Page.
"N6705B DC Power Analyzer, Modular, 600 W, 4 Slots," Keysight Technologies, url: https://www.keysight.com/us/en/product/N6705B/dc-power-analyzer-modular-600-w-4-slots.html, accessed Apr. 4, 2019, 2 Pages.
"USBXpress™ Family CP2102N Datasheet," Silicon Labs, Published May 2016, Rev. 1.3 Mar. 2019, 47 Pages.
"Emergency Keychain 1,800 mAh Power Bank," PCNA, Product No. SM-3921, url: https://www.pcna.com/en-us/bullet/en-us/bullet-technology-power/product/sm-3921.html), accessed Apr. 4, 2019, 4 Pages.
Lambert, Fred, "Watch thieves stealing a Tesla through keyfob hack and struggling miserably to unplug it," Electrek, Oct. 21, 2018, url: https://electrek.co/2018/10/21/tesla-stealing-video-keyfob-hack/, accessed Apr. 4, 2019, 6 Pages.
"Home: Microchip Technology," url: https://www.microchip.com/, accessed Apr. 4, 2019, 1 Page.
Adib et al., "See Through Walls with Wi-Fi!," SIGCOMM Comput. Commun., Oct. 2013, pp. 75-86, Rev. 43, 4, Association for Computing Machinery, New York, NY, USA (12 Pages).
Chen et al., "FM-based Indoor Localization," Proceedings of the 10th international conference on Mobile systems, applications, and services, 2012, pp. 169-182, Association for Computing Machinery, New York, NY, USA (13 Pages).
Dhekne et al., "LiquID: A Wireless Liquid IDentifier," Mobisys '18, Jun. 10-15, 2018, pp. 442-454, Munich, Germany (13 Pages).
Diewald et al., "RF-based child occupation detection in the vehicle interior," 2016 17th International Radar Symposium (IRS), 2016, pp. 1-4 (4 pages).
Diraco et al., "A Radar-Based Smart Sensor for Unobtrusive Elderly Monitoring in Ambient Assisted Living Applications," Biosensors (Basel), Nov. 24, 2017, 7(4):55 (29 pages).
Duan et al., "WiDriver: Driver Activity Recognition System Based on WiFi CSI," International Journal of Wireless Information Networks, Jun. 2018, pp. 1-11, vol. 25, (11 Pages).
"System Reference document (SRdoc); Short Range Devices (SRD) using Ultra Wide Band (UWB); Technical characteristics and spectrum requirements for UWB based vehicular access systems for operation in the 3,4 GHz to 4,8 GHz and 6 GHz to 8,5 GHz frequency ranges," ETSI TR 103 416 V1.1.1, pp. 1-31, Jul. 2016, 31 Pages.
Francillon et al., "Relay Attacks on Passive Keyless Entry and Start Systems in Modern Cars," IACR Cryptology ePrint Archive, Jan. 2010, 16 Pages.
Großwindhager et al., "Concurrent Ranging with Ultra-Wideband Radios: From Experimental Evidence to a Practical Solution," 2018 IEEE 38th International Conference on Distributed Computing Systems (ICDCS), 2018, pp. 1460-1467 (8 Pages).
Großwindhager et al., "SALMA: UWB-based Single-Anchor Localization System using Multipath Assistance," 16th ACM Conference on Embedded Networked Sensor Systems (SenSys '18), 2018, pp. 132-144, Association for Computing Machinery, New York, NY, USA, (13 Pages).
Guvenc et al., "Ultra-wideband range estimation: Theoretical limits and practical algorithms," 2008 IEEE International Conference on Ultra-Wideband, 2008, pp. 93-96 (6 Pages).
Humayed et al., "Cyber-physical security for smart cars: taxonomy of vulnerabilities, threats, and attacks," ACM/IEEE Sixth International Conference on Cyber-Physical Systems (ICCPS '15), 2015, pp. 252-253, Association for Computing Machinery, New York, NY, USA (2 Pages).
Jaturatussanai et al., "Characteristics of UWB propagation through building materials," IEEE International Symposium on Communications and Information Technology, 2005, ISCIT 2005, pp. 995-998 (4 Pages).

(56) References Cited

OTHER PUBLICATIONS

Kalyanaraman et al., "Forma Track: Tracking People based on Body Shape," ACM on Interactive, Mobile, Wearable and Ubiquitous Technologies, Sep. 2017, vol. 1, No. 3, Art. 61, pp. 1-21 (21 Pages).
Kempke et al., "SurePoint: Exploiting Ultra Wideband Flooding and Diversity to Provide Robust, Scalable, High-Fidelity Indoor Localization," 14th ACM Conference on Embedded Network Sensor Systems CD-ROM (SenSys '16), 2016, pp. 16-20, Association for Computing Machinery, New York, NY, USA (5 Pages).
Kempke et al., "PolyPoint: Guiding Indoor Quadrotors with Ultra-Wideband Localization," 2nd International Workshop on Hot Topics in Wireless (HotWireless '15), 2015, pp. 16-20, Association for Computing Machinery, New York, NY, USA (5 Pages).
Knobloch, Daniela, "Practical challenges of particle filter based UWB localization in vehicular environments," 2017 International Conference on Indoor Positioning and Indoor Navigation (IPIN), 2017, pp. 1-5 (5 Pages).
Kotaru et al., "SpotFi: Decimeter Level Localization Using WiFi," 2015 ACM Conference on Special Interest Group on Data Communication (SIGCOMM '15), 2015, pp. 269-282, Association for Computing Machinery, New York, NY, USA (14 Pages).
Kuo et al., "Luxapose: indoor positioning with mobile phones and visible light," 20th annual international conference on Mobile computing and networking (MobiCom '14), 2014, pp. 447-458, Association for Computing Machinery, New York, NY, USA (12 Pages).
Lazik et al., "ALPS: A Bluetooth and Ultrasound Platform for Mapping and Localization," 13th ACM Conference on Embedded Networked Sensor Systems (SenSys '15), 2015, pp. 73-84, Association for Computing Machinery, New York, NY, USA (12 Pages).
Levitas et al., "UWB based oil quality detection," 2011 IEEE International Conference on Ultra-Wideband (ICUWB), 2011, pp. 220-224 (5 Pages).
Li et al., "Epsilon: A Visible Light Based Positioning System," 11th {USENIX} Symposium on Networked Systems Design and Implementation (NSDI '14), 2014, pp. 331-343, Seattle, WA, USA (14 Pages).
Li et al., "Practical Human Sensing in the Light," Mobisys '16, Jun. 25-30, 2016, pp. 71-84, Singapore, Singapore (14 Pages).
Melgarejo et al., "Leveraging directional antenna capabilities for fine-grained gesture recognition," Proceedings of the 2014 ACM International Joint Conference on Pervasive and Ubiquitous Computing, 2014 (11 Pages).
Nandakumar et al., "Contactless Sleep Apnea Detection on Smartphones," 13th Annual International Conference on Mobile Systems, Applications, and Services, 2015, pp. 45-57, Association for Computing Machinery, New York, NY, USA (13 Pages).
Nandakumar et al., "FingerIO: Using Active Sonar for Fine-Grained Finger Tracking," 2016 CHI Conference on Human Factors in Computing Systems, May 2016, pp. 1515-1525, Association for Computing Machinery, New York, NY, USA (11 Pages).
Pu et al., "Whole-home gesture recognition using wireless signals," Proceedings of the 19th annual international conference on Mobile computing & networking, Sep. 2013, pp. 27-38, Association for Computing Machinery, New York, NY, USA (12 Pages).
Raja et al., "Detecting Driver's Distracted Behaviour from Wi-Fi," 2018 IEEE 87th Vehicular Technology Conference (VTC Spring), 2018, pp. 1-5 (5 Pages).
"Raja et al., ""RFexpress!—Exploiting the wireless network edgefor RF-based emotion sensing,"" 2017 22nd IEEE International Conference on Emerging Technologies and Factory Automation (ETFA), 2017, 11 Pages."
"Ravichandran et al., ""WiBreathe: Estimating Respiration Rate UsingWireless Signals in Natural Settings in the Home,"" 2015 IEEE International Conference on Pervasive Computing and Communications (PerCom), 2015, pp. 131-139 (9 Pages)."
Richards, Mark A., "Fundamentals of Radar Signal Processing," Excerpt (Table of Contents) from First Edition, 2005, McGraw-Hill, New York, NY, USA (Cover and Table of Contents Only, 6 Pages).
Rodríguez-Ascariz et al., "Automatic system for detecting driver use of mobile phones," Transportation Research Part C: Emerging Technologies, 2011, vol. 19, Issue 4, pp. 673-681 (9 pages).
Varshavsky et al., "GSM indoor localization," Pervasive and Mobile Computing, 2007, vol. 3, Issue 6, pp. 698-720 (23 pages).
Vasisht et al., "Decimeter-Level Localization with a Single WiFi Access Point," 13th {USENIX} Symposium on Networked Systems Design and Implementation (NSDI '16), 2016, pp. 165-178, Santa Clara, CA, USA (15 pages).
Wang et al., "Understanding and Modeling of WiFi Signal Based Human Activity Recognition," 21st Annual International Conference on Mobile Computing and Networking (MobiCom '15), pp. 65-76 Association for Computing Machinery, New York, NY, USA (12 Pages).
Han et al., "WiFall: Device-Free Fall Detection by Wireless Networks," IEEE Transactions on Mobile Computing, Feb. 1, 2017, pp. 581-594, vol. 16, No. 2 (9 Pages).
Woyach et al., "Sensorless Sensing in Wireless Networks: Implementation and Measurements," 2006 4th International Symposium on Modeling and Optimization in Mobile, Ad Hoc and Wireless Networks, 2006, pp. 1-8 (8 Pages).
Xie et al., "Wireless CSI-based head tracking in the driver seat," 14th International Conference on emerging Networking EXperiments and Technologies (CoNEXT '18), Dec. 2018, pp. 112-125, Association for Computing Machinery, New York, NY, USA (14 Pages).
Xiong et al., "ArrayTrack: A Fine-Grained Indoor Location System," 10th {USENIX} Symposium on Networked Systems Design and Implementation (NSDI '13), 2013, pp. 71-84, Lombard, IL, USA (14 Pages).
Yang et al., "Detecting Driver Phone Use Leveraging Car Speakers," Proceedings of the Annual International Conference on Mobile Computing and Networking, MOBICOM, 2011, pp. 97-108 (12 Pages).
Bocca et al., "Contactless Breathing Rate Monitoring in Vehicle Using UWB Radar," RealWSN'18, Nov. 4, 2018, pp. 13-18, Shenzhen, China (7 Pages).
Yun et al., "Turning a Mobile Device into a Mouse in the Air," 13th Annual International Conference on Mobile Systems, Applications, and Services (MobiSys '15), 2015, pp. 15-29, Association for Computing Machinery, New York, NY, USA (15 Pages).
Yun et al., "Strata: Fine-Grained Acoustic-based Device-Free Tracking," 15th Annual International Conference on Mobile Systems, Applications, and Services (MobiSys '17), 2017, pp. 15-28, Association for Computing Machinery, New York, NY, USA (14 Pages).
Zeng et al., "Analyzing Shopper's Behavior through WiFi Signals," 2nd workshop on Workshop on Physical Analytics (WPA '15), 2015, pp. 13-18, Association for Computing Machinery, New York, NY, USA (6 Pages).
Zeng et al., "WiWho: WiFi-Based Person Identification in Smart Spaces," 15th ACM/IEEE International Conference on Information Processing in Sensor Networks (IPSN), 2016, pp. 1-12 (12 Pages).
Zeng et al., "Your AP knows how you move: fine-grained device motion recognition through WiFi," 1st ACM workshop an Hot topics in wireless (HotWireless '14), 2014, pp. 49-54, Association for Computing Machinery, New York, NY, USA (5 Pages).
Zhao et al., "Emotion Recognition Using Wireless Signals," 22nd Annual International Conference on Mobile Computing and Networking, Oct. 3-7, 2016, pp. 95-108, ACM Press, New York City, New York (15 Pages).
Kalyanaraman et al., "CaraoKey: Car States Sensing via the Ultra-Wideband Keyless Infrastructure," 17th Annual IEEE International Conference on Sensing, Communication, and Networking (SECON), 2020, pp. 1-9, IEEE Press (9 Pages).
Kalyanaraman, Avinash, et al. "Caraokey: Car states sensing via the ultra-wideband keyless infrastructure." 2020 17th Annual IEEE International Conference on Sensing, Communication, and Networking (SECON). IEEE, 2020.

\* cited by examiner

ULTRA-WIDEBAND INTELLIGENT SENSING SYSTEM AND METHOD FOR CAR STATES DETECTION

TECHNICAL FIELD

The following relates generally to an ultra-wideband sensing system and method that may provide increased context awareness, safety, and security.

BACKGROUND

For automotive applications, keyless entry systems provide remote access allowing users the ability to remotely lock or unlock vehicle doors. For instance, key fobs include buttons for locking/unlocking vehicle doors. More recently, automotive manufacturers have begun to introduce what is referred to as passive keyless system. Passive keyless systems may not require pressing a button to lock/unlock vehicle doors. Passive keyless systems also may not require a physical key to start the vehicle. Instead, passive keyless systems may, allow such actions to be performed when the key fob is located near or within the vehicle.

SUMMARY

In one embodiment, a system and method is disclosed for determining a particular vehicle state that may include (1) determining the location of a user is situated within a vehicle; or (2) the position of a vehicle seat, vehicle window, or door—i.e., whether a door or window is open/closed. Determining the vehicle state may include receiving a UWB signal at a plurality of receiving nodes. A plurality of channel-impulse responses (CIRs) may be computed from the UWB signal received from the plurality of receiving nodes. A plurality of peak-based features based on a selected position and amplitude may be extracted from the plurality of CIRs. A plurality of correlation-based features may be generated by correlating the plurality of CIRs to a corpus of reference CIRs relating to a plurality of vehicle states. A plurality of maximum likelihood vehicle matrices may be generated by correlating the plurality of CIRs to the corpus of reference CIRs relating to the plurality of vehicle states. The plurality of maximum likelihood vehicle matrices may be summed to generate a top-K vehicle state matrix. The vehicle state may then be determined by processing the plurality of peak-based features and correlation-based features using the machine learning classification algorithm within the top-K vehicle state matrix.

The system and method disclosed may further include using a Fast Fourier Transformation (FFT) algorithm to upsample the plurality of CIRs. The FFT algorithm may operate on the time domain of the plurality of CIRs. The first path may also be identified as an event that occurs in the plurality of CIRs. It is also contemplated that the system and method may include a machine learning process that includes a training phase and testing phase for generating the vehicle matrices and algorithms used to determine a vehicle state. The maximum likelihood vehicle matrices may also be generated during a machine-learning process that includes a training phase and testing phase It is also contemplated that the system and method disclosed may determine the one or more peak-based features based on: (1) a ratio of power of a first peak of the plurality of CIRs; (2) a ratio of power of a top peak of the plurality of CIRs; (3) a relative tap distance between a first peak of the plurality of CIRs; (4) a relative tap distance between a top peak of the plurality of CIRs; (5) a maximum peak power of the plurality of CIRs; and (6) a position of the maximum peak power of the plurality of CIRs.

DETAILED DESCRIPTION

Figure 1:
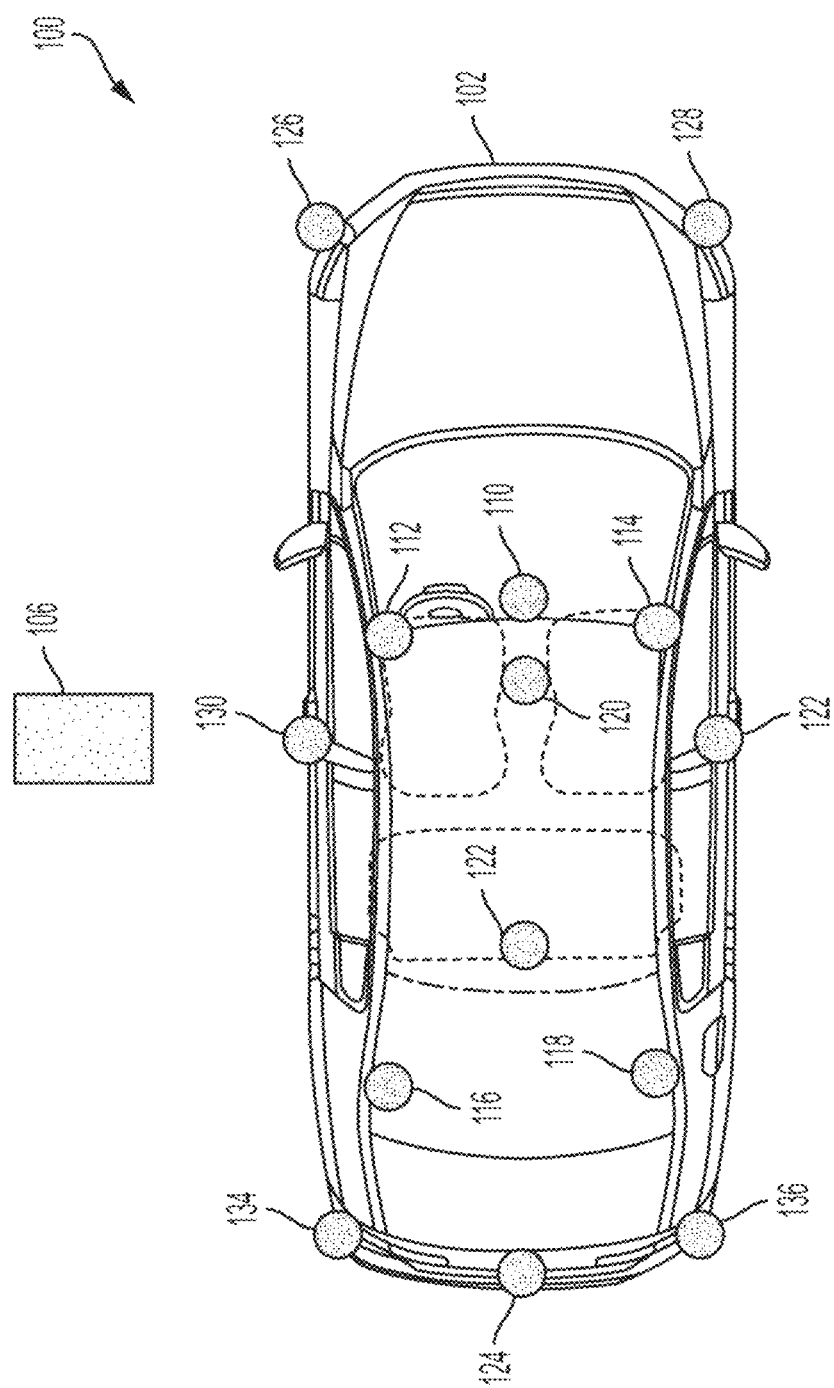
FIG. 1 is an illustrative example of the ultra-wide band sensing (UWB) system located within a vehicle.

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

With the ongoing advancements in wireless technologies, people now use any number of connected and personalized services. As the number of wireless systems and services increases, manufacturers have begun to leverage such preexisting systems and services in a different way than what was originally contemplated. For instance, manufacturers have begun to leverage radio frequency (RF) transceivers (such as WiFi) to track moving humans through walls and behind closed doors. The use of WiFi to track human movement is much different than the original use-case of a way to communicate data between electronic devices. By leveraging a pre-existing system beyond an intended application, manufacturers have been able to reduce the need for extra hardware which in turn reduces cost, space and/or provide increased power savings.

In automotive applications, key fobs have become more common for certain functions. For instance, when a user is located within the vicinity of a vehicle, the key fob may be used to automatically unlock doors. Or when a user is located within the vehicle, the key fob may allow the user to start the vehicle using a push button. To perform these functions, a key fob will wirelessly communicate and perform an authentication process. Currently, automotive manufacturers may rely on two types of radio frequency (RF) technologies. For passive entry systems (PES) and comfort entry go (CEG) applications, a low frequency (LF) technology may be used for key fob proximity and localization. For remote keyless entry, ultra-high frequency (UHF) technology may be employed. However, traditional LF and UHF technologies may not be adequate for additional leveraging. For instance, traditional LF and UHF technologies may not be capable of performing detection of users within a vehicle. As a result, additional systems may be required to perform such functionality. Also, LF and UHF systems have been known to be subjected to security breaches including "relay" attacks. There exists a need to provide a single system that can operate to provide more than just vehicle access and starting capabilities and to provide a system that can perform such functionality with improved security.

As disclosed by U.S. patent application Ser. No. 16/042, 397, which is incorporated herein by reference, an Ultra-Wideband (UWB) system is disclosed and operable to perform certain automotive functions such as vehicular access (i.e., keyless entry). UWB technology may be preferred over LF and UHF technology because it may provide more robust functionality and improved security capabilities. It is contemplated that a UWB system may also be capable of providing increased context awareness, safely, and security applications.

FIG. 1 illustrates a UWB system 100 that may include nodes 110-136 located at various locations around a vehicle 102. The number and location of nodes 110-136 may depend on the desired accuracy, application, performance, and/or the make and model of the vehicle 102. For instance, the UWB system 100 may include one or more nodes 112 that are able to monitor a sensing zone within and around the vehicle 102. Placement may allow the UWB system 100 to use information received by nodes 110-124 to perform features internal to the vehicle 102 and nodes 126-136 to perform features external to the vehicle 102. For instance, based on information received from nodes 126-136 the UWB system 100 may detect a user is within the vicinity of vehicle 102 and subsequently unlock the doors of vehicle 102. If there exists a stored user profile, UWB system 100 may be operable to automatically adjust the vehicle seats, adjust the rear-view mirrors, activate the rear-view camera, adjust the HVAC system to a desired vehicle cabin temperature, or activate the in-cabin infotainment system.

Similarly, nodes 110-124 (i.e., internal nodes) may be used to start the vehicle 102 when the UWB system 100 determines target portable device 106 is within the vehicle 102. UWB system 100 may also be operable to perform the following functions: (1) detecting the state of the vehicle 102 (e.g., whether the vehicle 102 is unoccupied or occupied; or whether a door, window, or trunk is open); (2) monitoring the vital signs of an occupant within the vehicle 102 (e.g., heart rate or breathing rate); (3) determining the occupancy of the vehicle 102 (i.e., count the number of people in the vehicle 102); (4) detecting human movement or activity near the vehicle; (5) detecting the occupancy when a driver passenger approaches (or leaves) the vehicle 102; and (6) detecting an intrusion in the vehicle 102 while ensuring complete privacy.

Nodes 110-136 may include a processor, memory, and a transceiver unit. The memory may be configured to store program instructions that, when executed by the processor, enable the nodes 110-136 to perform various operations described elsewhere herein, including localization of a target portable device 106 (e.g., a key fob, smart phone, or smart watch). The memory may be of any type of device capable of storing information accessible by the processor, such as write-capable memories, read-only memories, or other computer-readable mediums. Additionally, it will be recognized by those of ordinary skill in the art that a "processor" may include hardware systems, hardware mechanisms or hardware components that processes data, signals or other information. The processor may include a system with a central processing unit, multiple processing units, dedicated circuitry tor achieving functionality, or other systems.

The nodes 110-136 may use an ultra-wideband transceiver configured to communicate with the target portable device 106. But nodes 110-136 may also include transceivers configured for communication with other electronic devices, including the ability to send communication signals and receive communication signals. The transceiver included within nodes 110-136 may comprise multiple ultra-wideband transceivers and/or multiple ultra-wideband antennas arranged in an array. The nodes 110-136 may also allow wireless or wired communication between the nodes 110-136 and/or communication with one or more control modules located within vehicle (e.g., ECU, HVAC system, security system) or external to the vehicle 102. The control module may also include a processor and memory that is operable to receive, store, and transmit information between the control module and the nodes 110-136. The control module may also be operable to control various systems (e.g., HVAC system) within the vehicle 102 based on the information received from the nodes 110-136.

Figure 2:
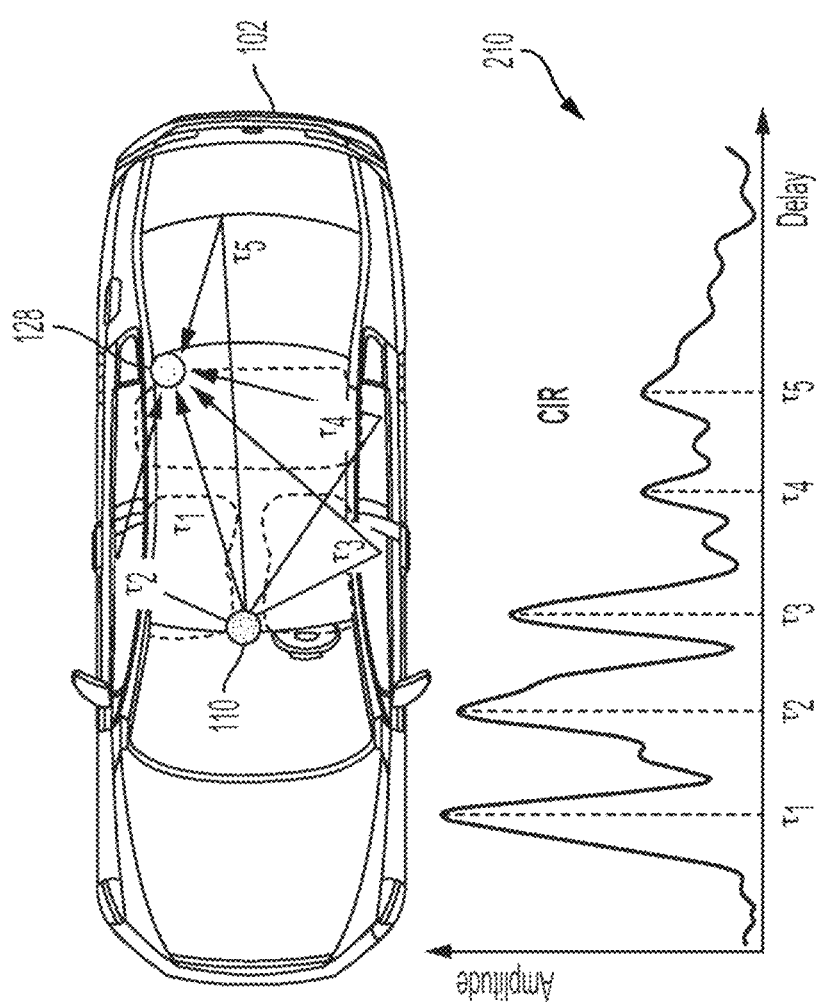
FIG. 2 is an illustrative example of the channel impulse response (CIR) signals received by the UWB system.

Nodes 110-136 may be operable as a transceiver for sending and receiving a UWB message. One or more of nodes 110-136 may periodically transmit (or blink) a UWB message. One or more nodes 110-136 may perform the UWB-based sensing of car states using the channel impulse response (CIR) computed by a given receiver. For instance, FIG. 2 illustrates node 110 transmitting a UWB message that may be received by node 118. As illustrated, UWB message may be reflected at various points (shown by $\tau_1$-$\tau_5$) around the vehicle 102.

Graph 210 illustrates the CIR that may be computed by node 118 based on the reflected UWB message. As shown, the CIR for $\tau 1$ may have the greatest amplitude and the least amount of time delay because it was not reflected at any point within vehicle 102. Conversely, the CIR for $\tau 5$ may have one of the smallest amplitudes and the largest delays because it was reflected by a rear point (e.g., the trunk) of the vehicle 102 before being received by node 118.

Figure 3:
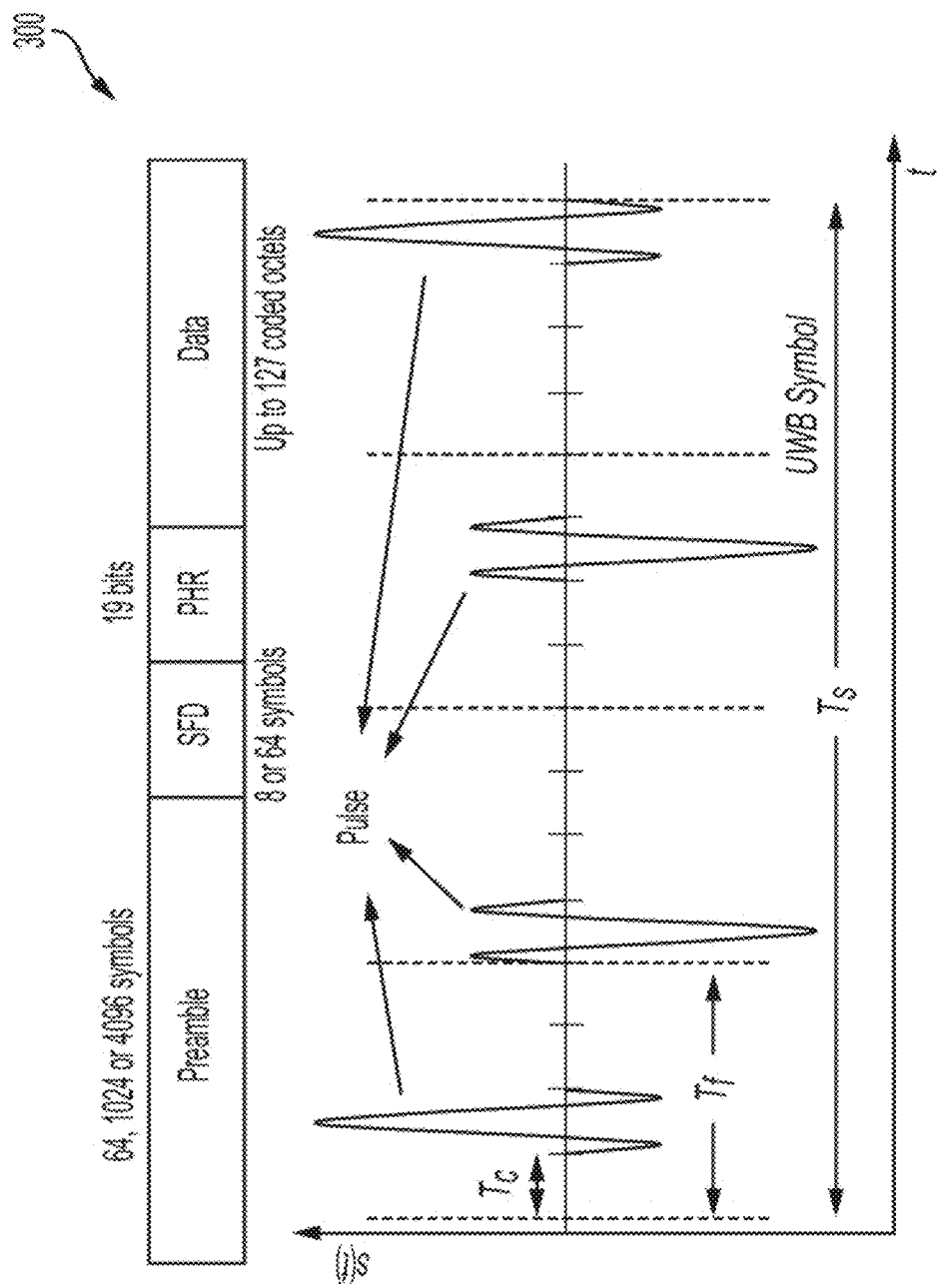
FIG. 3 is an illustrative example of a UWB signal.

FIG. 3 illustrates an exemplary UWB packet (message) that may be transmitted by nodes 110-136. The preamble of UWB packet may include a synchronization header that may be of a 64, 1024 or 4096 symbol-length known preamble sequence followed by an 8 or 64 symbol-length start of frame delimiter (SFD). A 19-bit physical header (PHR) may follow the SFD and include information for successful packet decoding such as the length and the data rate of the following data payload. The UWB symbol ($T_s$) may be comprised of multiple narrow pulses, and the pulses generated by the preamble may be used to compute the CIR when received by nodes 110-136. The exemplary UWB symbol shown includes a chipping sequence {1, 0, 2, 3} and the four exemplary pulses illustrate a polarity of +1, −1, −1, and +1. The transmitted UWB symbol may be represented by the following equation:

$$s(t) = \sqrt{E_p} * \Sigma_{j=0}^{N_f-1} b_j \omega(t - jT_f - c_j T_c)$$ (Equation 1)

Where $\omega(t)$ denotes the UWB pulse of duration $T_p$; $T_f$ may be the duration of a given frame (i.e., a symbol that may be divided into $N_f$ frames); $b_j \in \{-1, +1\}$ denotes the polarity code; $c_j$ denotes the hopping sequence; $T_c$ is the chip duration; and, $E_p$ represents the energy of the symbol. The hopping sequence $c_j$ may also be part of a set $\{1, 2 \ldots N_h\}$ where $N_h$ is the number of hopping slots (i.e., the hopping code may determine the location of the pulse within the $N_h$ slots of the frame).

As described with respect to FIG. 2, the UWB messages may travel wirelessly across multiple paths before being received by a given node. The signal received at a given node (e.g., node 122) for a given UWB message that is reflected by any number of different paths may be represented by the following equation:

$$s(t) = \sqrt{E_p} * \Sigma_{j=0}^{N_f-1} \Sigma_{l=1}^{L} \alpha_l b_j \omega(t - \tau_l - jT_f - c_j T_c)$$ (Equation 2)

Where $\alpha_l$ and $\tau_l$ refer to the complex attenuation and time of flight of the $l^{th}$ path. A UWB receiver included within nodes 110-136 may leverage the periodic auto-correlation property of the known preamble sequence illustrated by FIG. 3 to compute the CIR. In other words, the UWB receiver may correlate the received signal with the known preamble sequence to compute a channel impulse (CIR) which is represented by the following equation:

$$h(t) = \Sigma_{l=1}^{L} \alpha_k \delta(t - \tau_l)$$ Equation 3

Where $\delta(.)$ represents the Dirac delta function. Nodes 110-136 may use this computed CIR to identify a car slate by leveraging the intuition that the different stales of the car may affect the CIR differently.

Figure 4A:
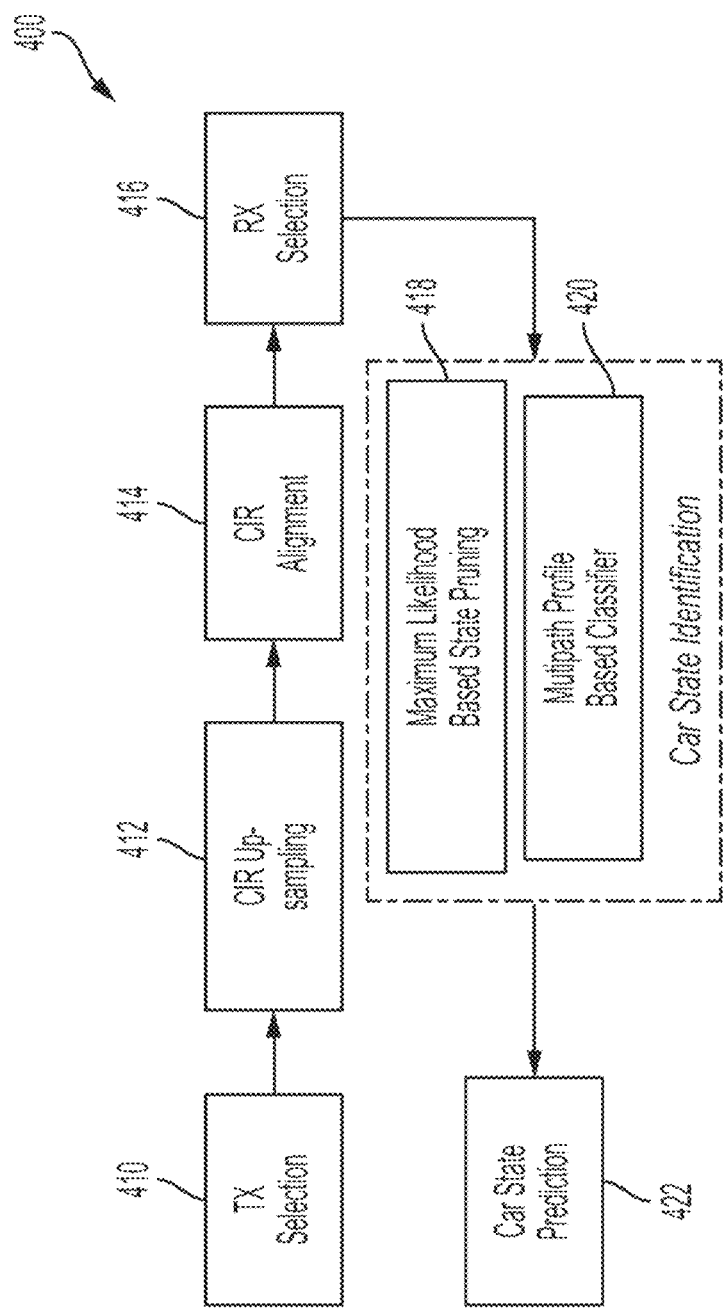
FIG. 4A is an illustrative operational block diagram of the UWB system during a calibration process.
Figure 4B:
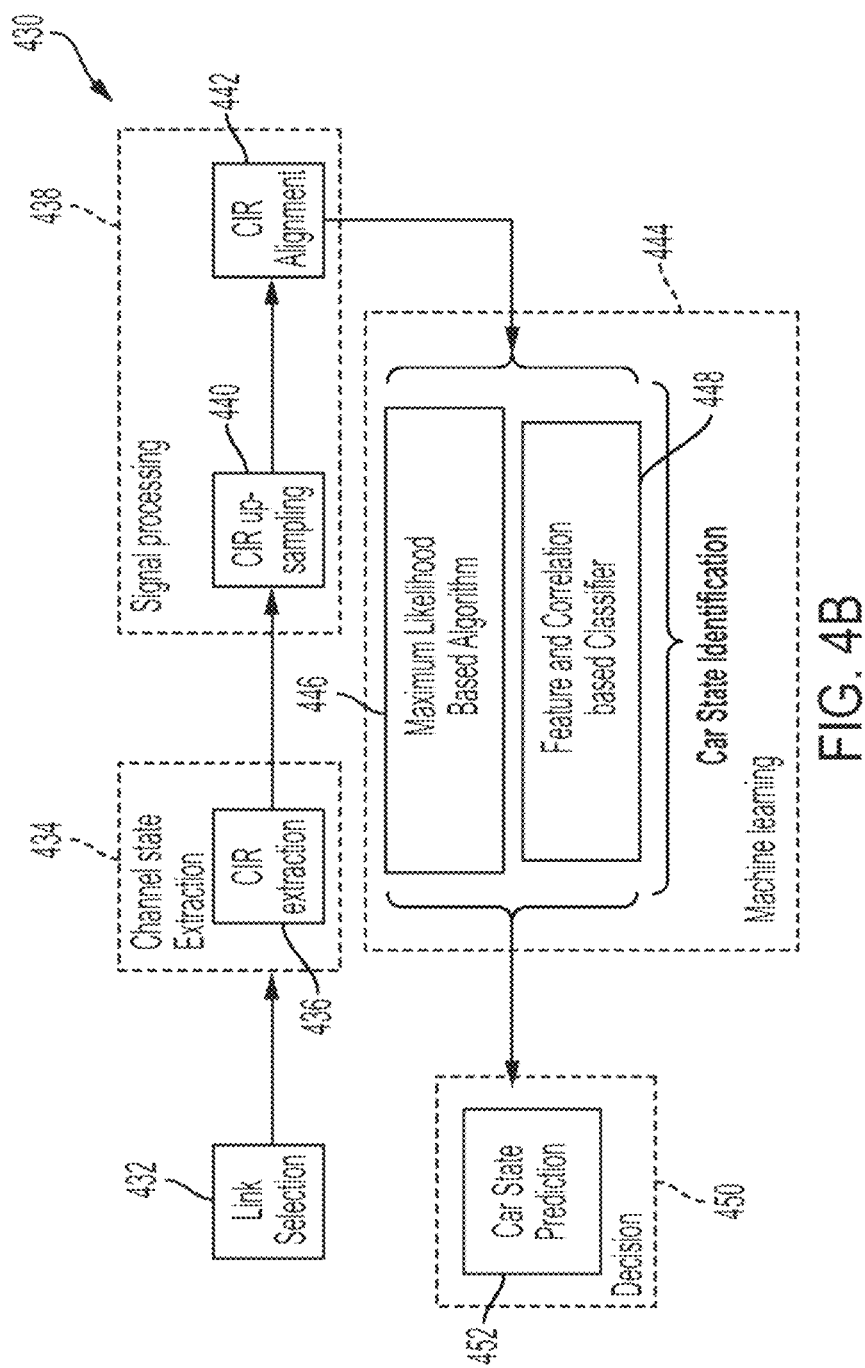
FIG. 4B is an illustrative operational block diagram of the UWB system during a runtime process.

FIG. 4A is a flow diagram 400 of the UWB system 100 operating during a calibration or initial setup process. FIG. 4B is a flow diagram 430 of the UWB system operating during a runtime process. The similarities and differences between the calibration process illustrated by flow diagram 400 and the runtime process illustrated by flow diagram 430 will be discussed below.

At steps 410 and 432, UWB system 100 may select one of nodes 110-136 to operate as a transmitter. For flow diagram 430, the link selection (i.e., node selection) may be predetermined based on the calibration process performed by flow diagram 400.

With reference to flow diagram 400, the transmitting node may be selected based on connectivity (UWB packet deliver rate) and the strength of the received packet and location of the nodes 110-136. In other words, step 410 may determine which of the nodes 110-136 are operable to communicate with each other.

Figure 5A:
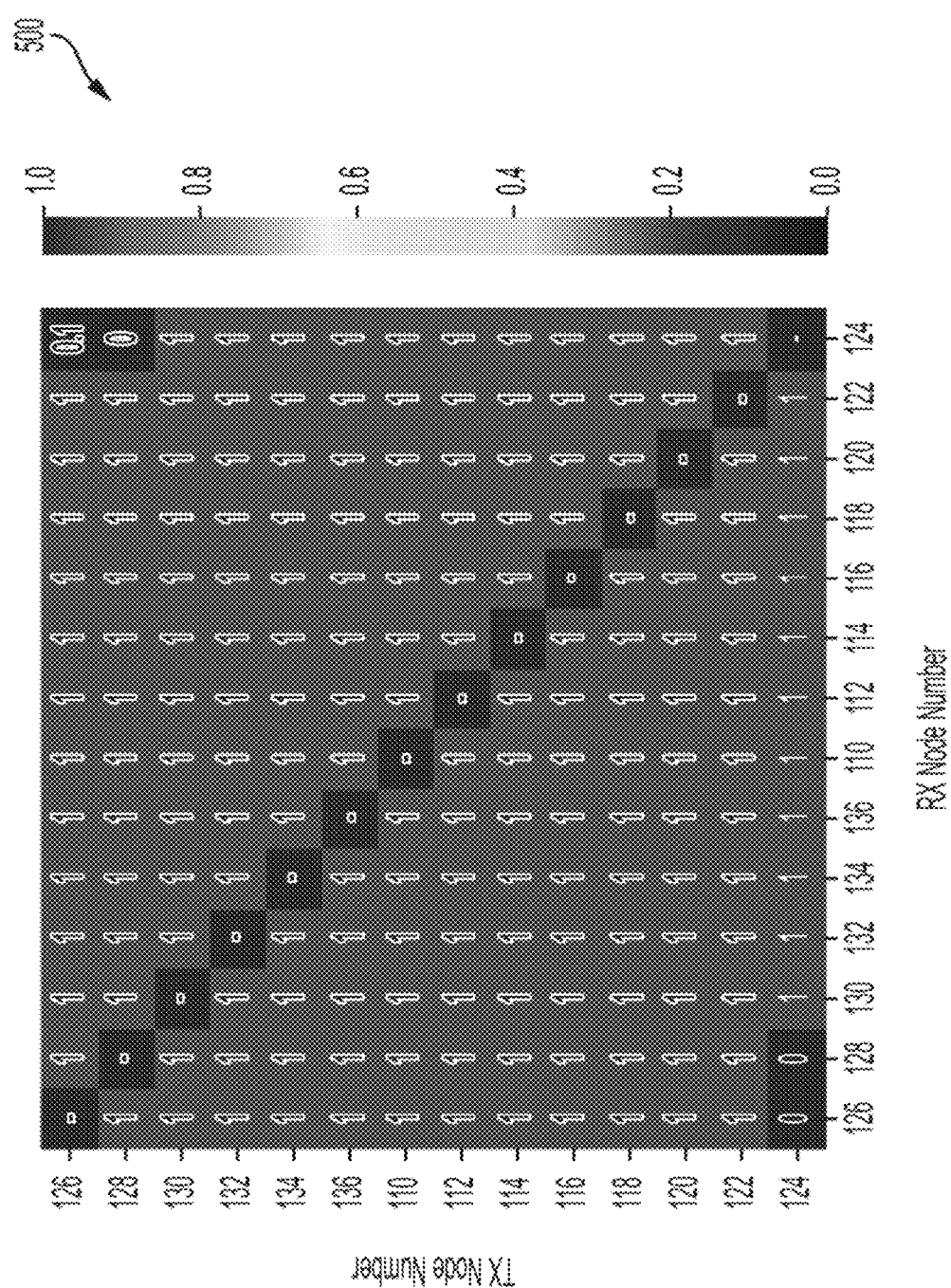
FIG. 5A is an illustrative matrix showing the transmission and reception connectivity by the nodes within the UWB system.

For instance, FIG. 5A is a graph 500 illustrating the connectivity matrix (i.e., blink delivery rate) of the nodes 110-136. The vertical axis illustrates the transmission (TX) of a given UWB packet from the nodes 110-136. The horizontal axis illustrates the reception (RX) of transmitted UWB packet at the nodes 110-136. For the connectivity matrix illustrated, the UWB system 100 may have each node 110-136 send numerous blinks sequentially (e.g., 14,000 blinks), and the UWB system 100 may then compute the blink delivery rate at the nodes 110-136. The connectivity matrix illustrates a "1" for a strong UWB packet delivery ratio and a "0" for a weak UWB packet delivery ratio. As shown, node 124 located in the rear of the vehicle 102 (e.g., the trunk) may have a low (weak) delivery ratio with respect to nodes 126 and 128 located at the front end of the vehicle 102.

Figure 5B:
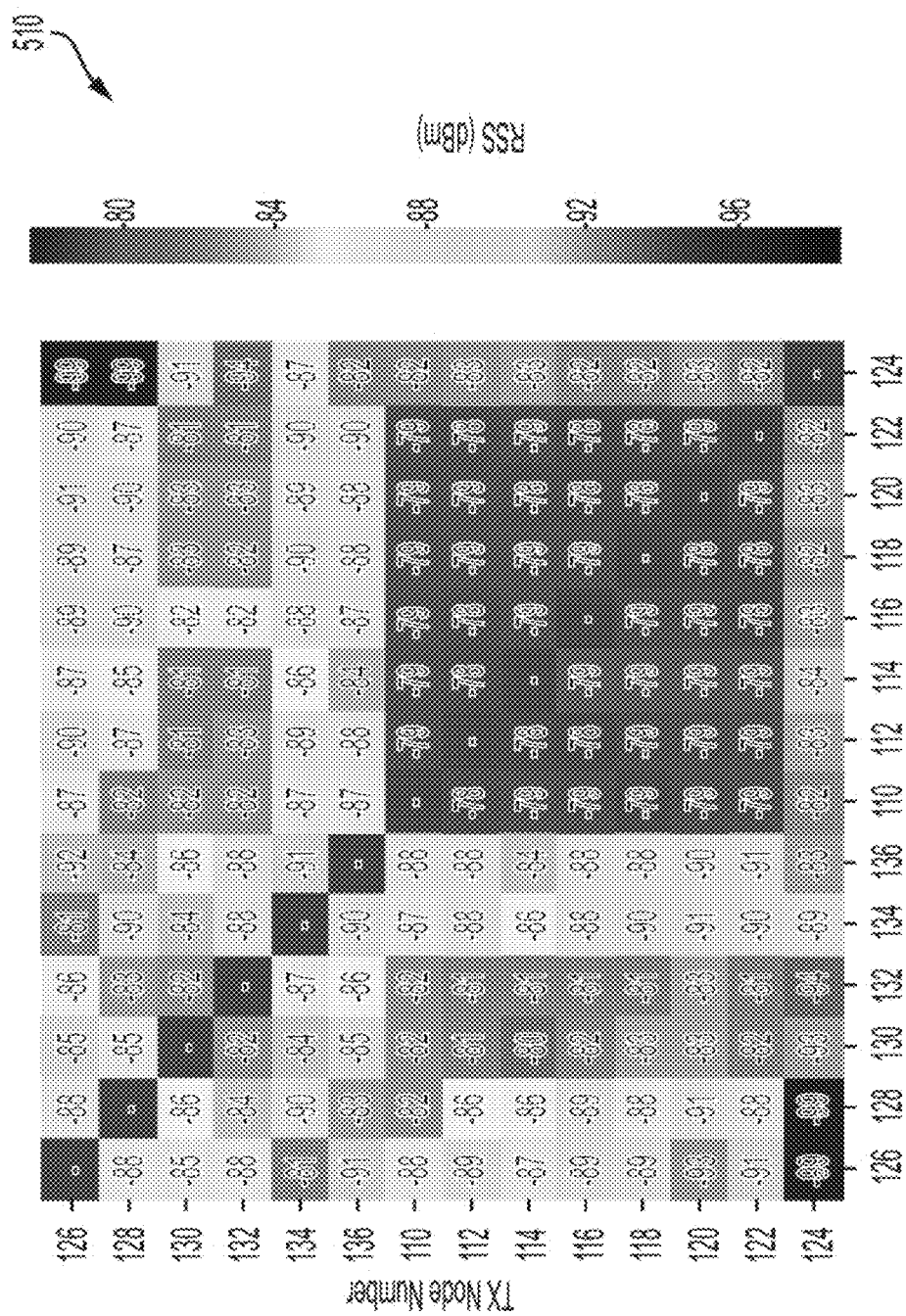
FIG. 5B is an illustrative matrix showing the received signal strength of the nodes within the UWB system.

FIG. 5B is another graph 510 illustrating the average received signal strength (RSS) as determined at the nodes 110-136. The vertical axis illustrates the transmission (TX) of a given UWB packet from the nodes 110-136. The horizontal axis illustrates the reception (RX) of transmitted UWB packet at nodes 110-136. It may also be understood that a less negative RSS number indicates a higher signal strength. As shown by FIG. 5B, a UWB packet transmitted by node 124 located in the rear of vehicle 102 would have a low signal strength when received at nodes 126 or 128. However, a signal transmitted by node 112 would have a high signal strength when received by node 110. FIG. 5B illustrates that nodes 110-124 (i.e., interior nodes) may have a high RSS because there is no significant attenuating object to impede the transmitted signal, such as the metal frame of vehicle 102. FIG. 5B also illustrates that nodes 126-136 (i.e., exterior nodes) may have a lower RSS because the transmitted signal may be impeded by the metal frame of the vehicle 102.

Using the data gathered from the connectivity test, the calibration process may establish node 110 as the transmitting node (i.e., tag) and the remaining nodes 112-136 as receivers (i.e., slave nodes). Node 110 may be selected as the transmitting node because: (1) node 110 can communicate with nodes 112-136 at a reasonably high power; and (2) node 110 may create a symmetric sensing region in the vehicle 102.

During the runtime process (i.e., FIG. 4b), the UWB system 100 may store the results of the connectivity tests so that node 110 is selected as the transmitting node (i.e., tag) and the remaining nodes 112-136 are selected as receivers (i.e., slave nodes). Or the UWB system 100 may be preprogrammed so that node 110 is established as the transmitting node (i.e., tag) and the remaining nodes 112-136 are established as receivers (i.e., slave nodes).

Because UWB system 100 may use a single transmitting node (e.g., node 110 may be considered a "tag") a total of N nodes (e.g., nodes 110-136) may be available while N−1 links are treated as sensors (e.g., nodes 112-136 are sensors or "slaves" because node 110 is considered the "tag"). It is contemplated that the N internal nodes may be made transmitters, however, in a round-robin manner. UWB system 100 may then use N(N−1)/2 links as sensors. By operating in a round-robin manner, the average power draw may be reduced because operating nodes 110-136 as transmitters less current will be drawn than operating nodes 112-136 as receivers alone. Also, operating in a round-robin manner may also improve the robustness of UWB system 100. Further, a subset of nodes can be made transmitters communicating with respective disjoint (mutually exclusive) subset of receivers, simultaneously with the transmitter on different frequency band.

Figure 6:
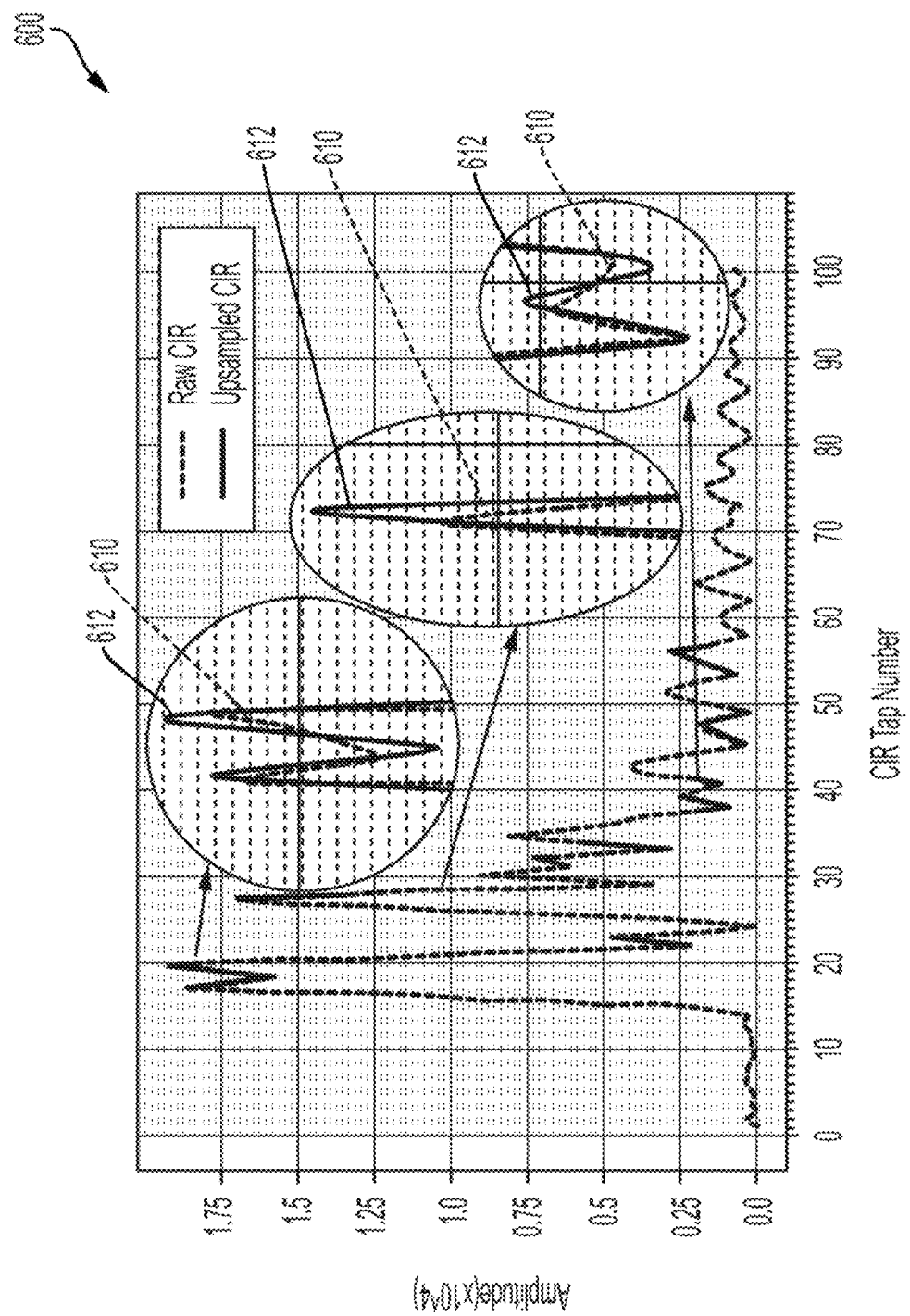
FIG. 6 is an illustrative example of a raw and upsampled CIRs.

At steps 412 and 440, the resolution of the CIR computed by the receiver of nodes 110-136 may be increased by interpolating and upsampling in the frequency domain to aid in accurate alignment and feature extraction. Again, node 110 may transmit a blink that will have an associated CIR when received by nodes 112-136. For a UWB bandwidth of 1 GHz, the CIR tap may be 1 nanosecond apart. The resolution of the CIR may be increased by an upsampling process where the UWB system 100 can make the received response emulate the original analog waveform. By performing an upsampling process the UWB system 100 may be able to more accurately align the CIR received by a given node (e.g., node 110). FIG. 6 is a graph 600 illustrating how the upsampling process that may performed on a raw CIR waveform 610 to generate an upsampled CIR waveform 612. During the calibration process (i.e., FIG. 4*a*), step 412 may undergo several iterations of testing to improve the upsampling algorithm employed. At step 440, UWB system 100 will operate based on the predefined upsampling algorithm established during step 412.

It is contemplated that the algorithm employed during the upsampling process (i.e., steps 412 and 440) may include a Fast Fourier Transformation (FFT) algorithm that operates on the time-domain CIR y. The upsampling process (i.e., steps 412 and 440) may also zero-pad the frequency domain signal by factor of N*(K−1), where N may be the number of taps in the CIR and K may be the upsampling factor. The upsampling process (i.e., steps 412 and 440) may also obtain the upsampled CIR ŷ by taking the the inverse-FFT of the upsampled frequency domain signal.

Figure 7B:
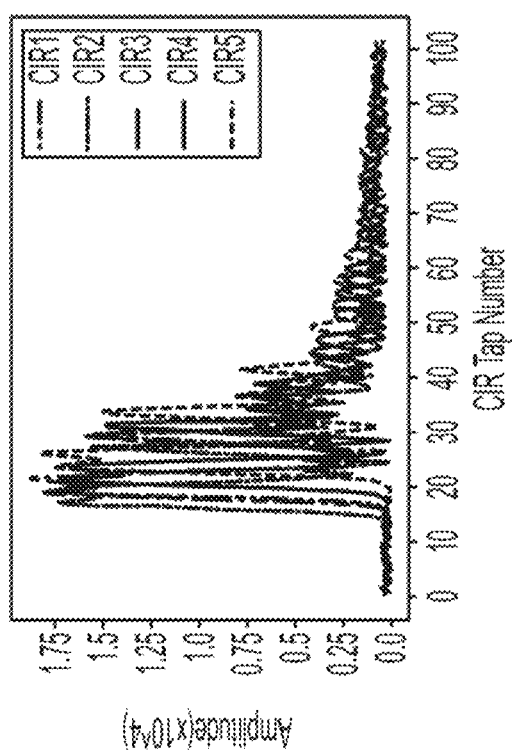
FIG. 7B is an illustrative example of five CIRs that have been aligned by the UWB system.
Figure 7A:
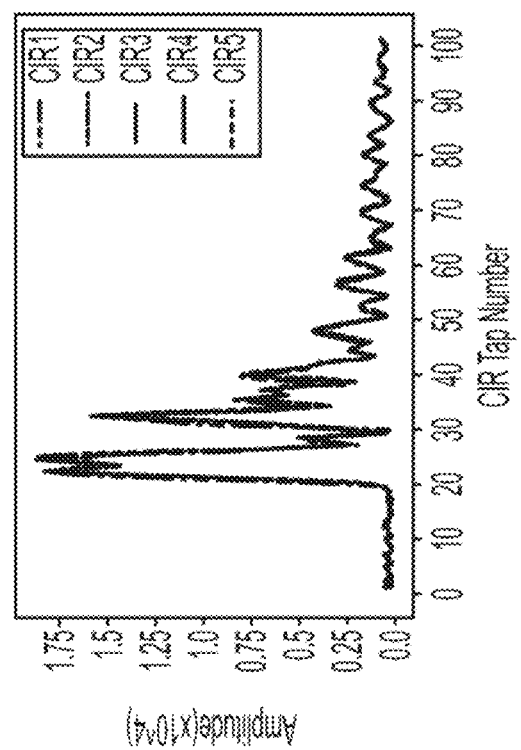
FIG. 7A is an illustrative example of five CIRs received at a node within the UWB system.

At steps 414 and 442, a CIR alignment process may be employed to randomly shift the CIR. Steps 414 and 442 may align the CIRs received by nodes 110-136 by pivoting the first (direct) path at a reference tap. For instance, FIG. 7A illustrates five separate CIRs that may be computed when received for example by node 110. As illustrated, the five CIRs are misaligned when computed by node 110 because there may not exist synchronization between the receiver of node 110 and the transmitter of node (e.g., node 126) where the five CIRs had originated. It is therefore contemplated that CIR alignment may be necessary because the receiver of node 110 and transmitter of node 126 are not synchronized with respect to one another. The same misalignment may occur between the receiver and transmitter of all the nodes 110-136. It is therefore contemplated that synchronization between nodes 110-136 may be accomplished using a reference clock, although this may not be desirable as extensive wiring throughout the vehicle 102 to connect the nodes 110-136 would be required.

It is contemplated that physical wiring may be avoided if the nodes 110-136 perform alignment by identifying an "event" that may typically occur in all CIRs independent of the environment. The UWB system 100 may then be able to shift the location (i.e., tap) of that "event" to a reference pivot tap. In other words, the CIR may be shifted differently with the degree of a CIR shift depending on the tap corresponding to the arrival of the first (direct) path. Once the UWB system 100 has performed shifting of the CIR, the first path of the CIR computed by a given node 110-136 may now occur at the pivot. It is contemplated that the first path may not be the strongest path and that nodes 126, 128, 134, and 136 may be selected as the first path, but selection of nodes 126, 128, 134, and 136 as the first path may require further attenuation. FIG. 7A shows how the five CIRs received by node 110 may be aligned after the shifting process has occurred.

It is contemplated that the tap location may correspond to the arrival of the first-path (i.e., First Path Index ($FP_{idx}$)). This first-path alignment may benefit from upsampling as the $FP_{idx}$ may occur at a much finer resolution of (e.g., 15.625 picoseconds) as compared to the raw CIR tap resolution (e.g., 1 nanosecond). The "lag" between any two CIRs received by a node (e.g., node 110) may correspond to the difference between their first-path indices. The UWB system 100 may obtain the aligned CIR ŷ'(t) using the following equation:

$$\hat{y}'(t) = \hat{y}'(t+\alpha) \quad \text{Equation 4}$$

Where t refers to the tap and $\Delta = F * P_{idx} - \text{Pivot}$.

Figure 8:
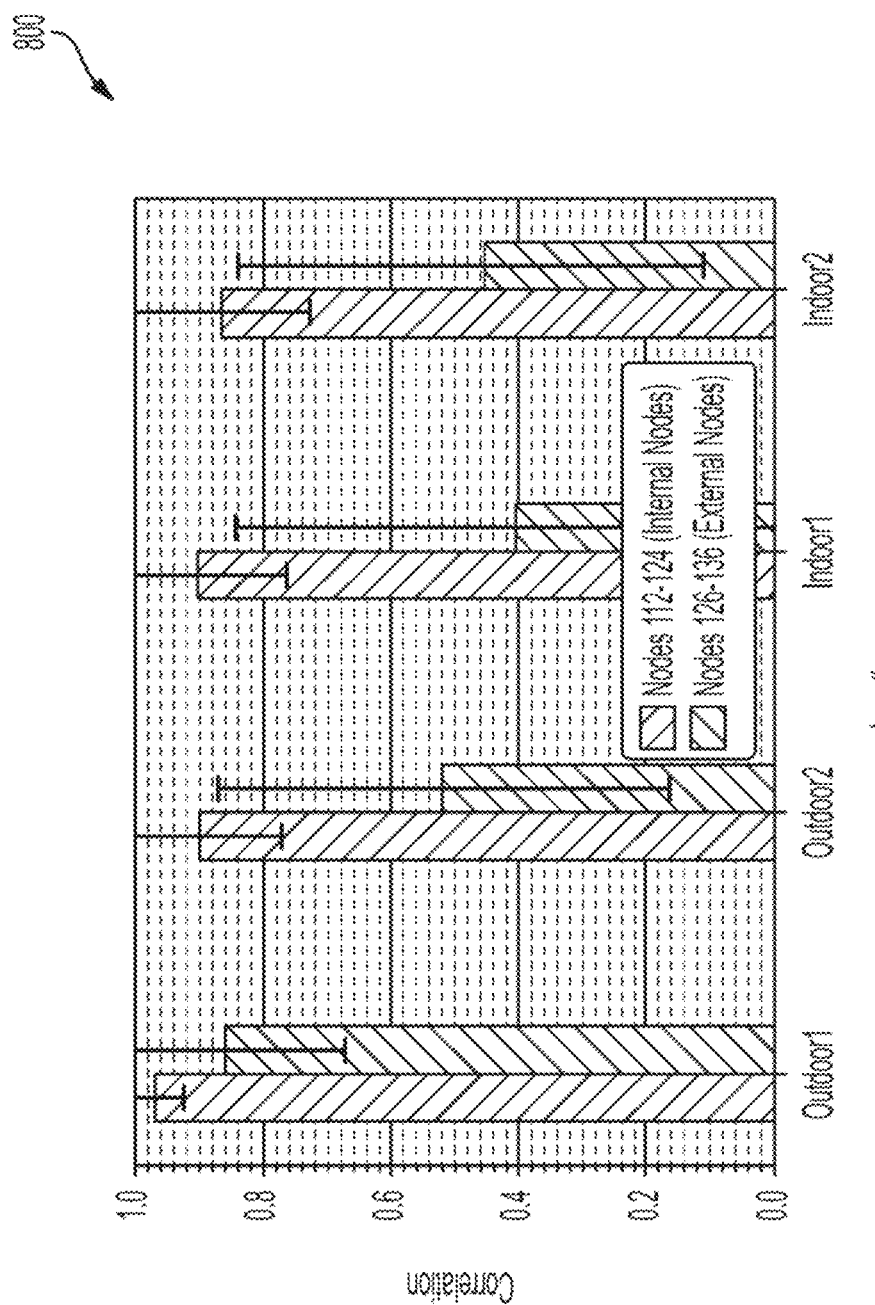
FIG. 8 is an illustrative graph showing the correlation of CIRs received by certain nodes within the UWB system.

With reference to flow diagram 400, the calibration process may include step 416 where a set of potential receivers for nodes 110-136 may be narrowed to those nodes that are more robust to location changes. In other words, upon aligning the CIRs received by a given node (e.g., node 110) with respect to the other nodes (e.g., nodes 112-136), the calibration process may be used to determine which if any other node may also operate as a receiver. For instance, FIG. 8 illustrates a graph 800 where vehicle 102 was parked at four different locations. In this example, vehicle 102 was parked at two different locations within an indoor garage, an outdoor location with another vehicle parked next to vehicle 102, and an outdoor location with no obstructions located next to vehicle 102. In this example, the calibration process may be used to select node 110 for transmission and nodes 112-136 for reception. As shown by FIG. 8, the calibration process may be used to establish that nodes 110-124 (internal nodes) have a much higher correlation than nodes 126-136 (external nodes). In this example, the calibration process would have been used to establish that the internal nodes be more robust to location changes than the external nodes of vehicle 102. It is contemplated that if nodes 110-136 are placed in a different location or a different size/type vehicle is used, the calibration process may establish using a different set of nodes for reception and transmission.

With reference to step 416, the average Pearson correlation coefficient may be computed between the CIRs located in free-space and the remaining locations for nodes 112-124 (i.e., internal nodes) and nodes 126-136 (i.e., external nodes). The correlation coefficient R between two CIRs x and y of duration t taps may be determined using the following equation:

$$R_{xy} = \frac{\sum_{i=1}^{t}(x_i - \bar{x})(y_i - \bar{y})}{\sqrt{\sum_{i=1}^{t}(x_i - \bar{x})^2} * \sqrt{\sum_{i=1}^{t}(y_i - \bar{y})^2}} \quad \text{(Equation 5)}$$

Where $x_i$, $y_i$ refer to the CIR amplitude in the $i^{th}$ tap of CIRs x and y respectively, and x, y refer to the sample mean of two CIRs.

Once UWB system 100 has selected the transceivers of interest and converted the CIRs to a desired format, UWB system 100 may identify a state of interest for vehicle 102. UWB system 100 may determine changes in a vehicle state (e.g., door open, window open, trunk open, or person inside) alter the multi-path reflections inside the vehicle 102, which may then be observed in the CIR. For instance, opening the driver-side door of vehicle 102 may eliminate (or create) reflections that may not exist if the door is closed. UWB system 100 may detect these changes in reflections to infer the vehicle state. UWB system 100 may perform this state inference using the combination of Steps 418 and 420.

At steps 418 and 444, the K-most likely states may be identified by correlating the CIRs observed by the nodes with a reference corpus. During the calibration process, step 418 may include a training phase where a training dataset of CIRs may be applied to improve the decision algorithm. During the runtime process, step 444 would not be provided a training dataset but would instead operate on received CIR. Having pruned the state space, steps 420 and 446 may be used to extract features from the CIR (i.e., to generate a multipath profile) that may then be used to identify a given vehicle state.

At steps 418 and 446, the algorithm may infer that some states may be captured better by some nodes (e.g., node 110) while other nodes (e.g., nodes 112-136) may infer a CIR equivalent to "empty." The algorithm may be operable to allow the nodes 110-126 to vote on a state-based correlation to an observed CIR (by the nodes) due to a transmitted blink. The algorithm may also use the results of the vote to compute the likelihood of being in the of the possible states. The algorithm employed by steps 418 and 446 may also fuse (e.g., using a vector summing function) the likelihood estimates from all the nodes, to obtain the top-K most likely states. It is contemplated that as part of step 418 the algorithm may be refined using a training phase and testing phase. Step 446 may then employ the algorithm refined by step 418.

Figure 9:
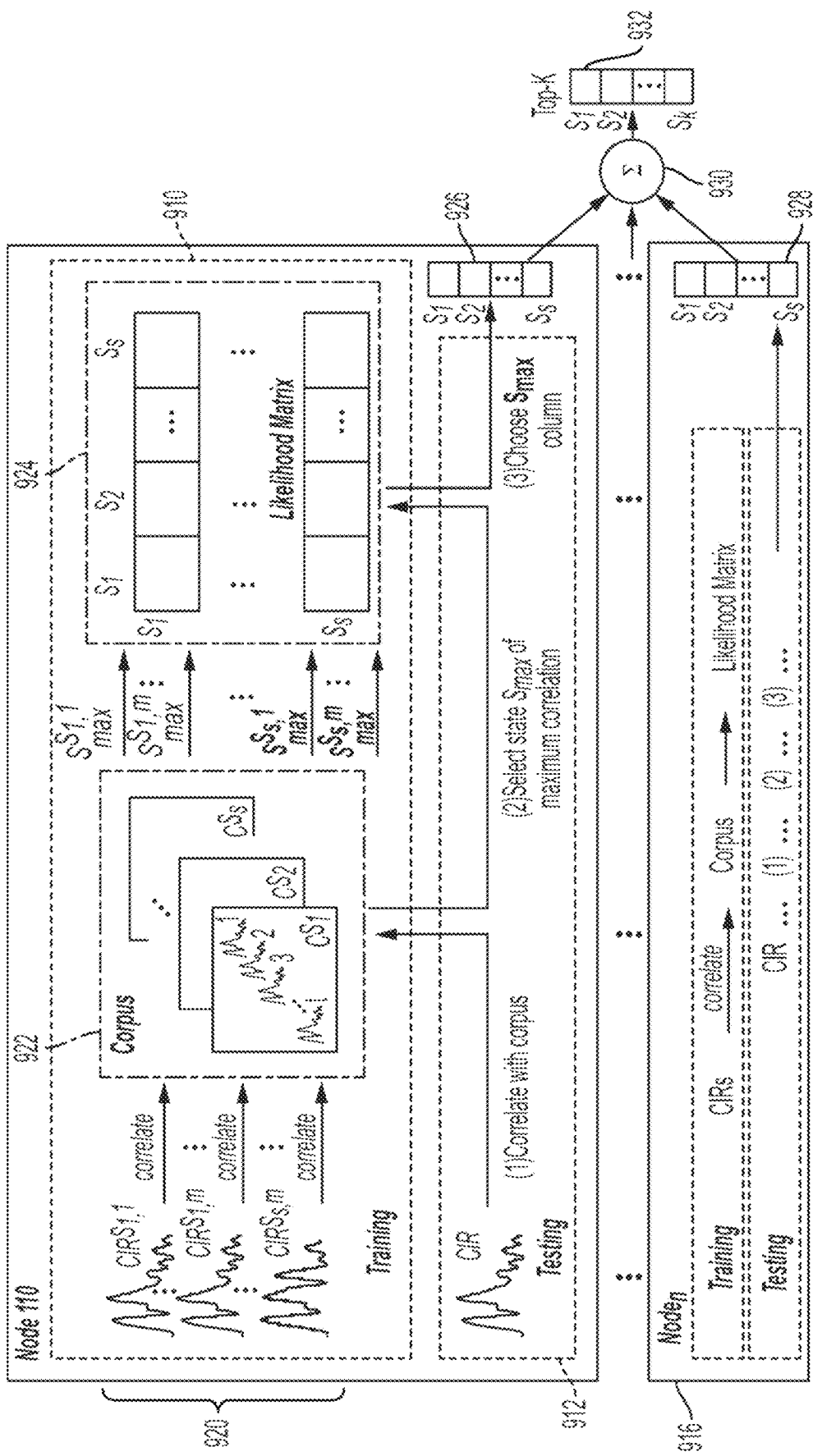
FIG. 9 is an illustrative example of the state identification process employed by the UWB system.

FIG. 9 illustrates a training phase 910 and testing phase 912 that may be employed by step 418. It is contemplated that the training phase 910 may be used during the calibration process illustrated by flow diagram 400. The testing phase 912, however, may be employed during the calibration process illustrated by flow diagram 400 and the runtime process it by flow diagram 430.

During the training phase 910, UWB system 100 may set $R=\{R_{110}, R_{112}, \ldots R_n\}$. This vector may be higher or lower depending on the number (n) nodes deployed within the vehicle 102. For instance, step 418 may establish n as correlating to the final node (i.e., $R_{136}$) employed within vehicle 102.

Step 418 may also establish a vehicle state of interest set (S). This vehicle state of interest set may be represented as $S=\{S_1, S_2, \ldots, S_n\}$. For instance, the set may include a vehicle empty ($S_1$), front door open ($S_2$), front window open ($S_3$), rear door open ($S_4$) rear window open ($S_5$), trunk open ($S_6$), a person situated in the front seat ($S_7$), or a person situated in the rear seat ($S_8$). The vehicle state of interest set is not limited to these examples, and the set may include more or less states depending on the application.

As shown by FIG. 9, the training CIRs 920 (e.g., $CIR^S_{S_i^1}$, $CIR^S_{S_i^2}$, $CIR^S_{S_i^m}$) for the simulated car state may then be provided. For instance, $CIR^S_{1}{}^1$ may correlate to a vehicle empty state $S_1$. Step 418 may proceed to operate on the CIR of state $S_x$ ($S_x \in S$) for the receiver nodes $R_n$. As shown, step 418 may also include a set of corpus reference CIRs 922 for the states by the nodes 110-136, The set of corpus reference CIRs 922 may be represented as $C_i=\{C_i^{S_1}, C_i^{S_2}, \ldots, C_i^{S_s}\}$ where i<n. Step 418 may correlate a given CIR with other CIRs in its corpus ($C_i$) and compute the mean correlation with the state. For instance, corpus $CIR^S_1$ may correlate to the state where the front door of the vehicle 102 is open.

Step 418 may further operate to generate a likelihood matrix $LM_i$ (where i<n), of dimensions sxs for each of the n nodes (i.e., for nodes 110-136). Step 418 may be operable to select and store a state of maximum correlation ($S_{max}^x$). Step 418 may repeat training phase 910 to generate different CIRs of state $S_x$ by the node $R_i$, resulting in a maximum likelihood vector 924 ($M_x=[S_{max}^1, S_{max}^2, \ldots, S_{max}^{x,m}]$). Step 418 may also compute a row of likelihood matrix which may be represented as follows:

$$S_y \in S, \text{ where } P(S_x|S_y) = \frac{\#\text{ of occurrencess of } S_y \text{in} M^x}{m}$$

Step 418 may be operable to repeat training phase 910 for each state and for every node 110-136 included within vehicle 102. Upon completing training phase 910, a likelihood matrix having a dimension of sxs is generated.

Once the training phase 910 is complete, step 418 may then employ a testing phase 912 to evaluate the machine learning algorithm established during training phase 910. It is contemplated that during step 418, the testing phase 912 may be employed to allow further modifications to the algorithm. For instance, step 418 may provide simulated CIRs to evaluate and further improve the machine learning algorithm. During the runtime process (i.e., FIG. 4B) step 446 may also employ the testing phase 912, however, a receiving node (e.g., node 110) will operate on CIRs received by the other nodes (e.g., nodes 112-136).

It is therefore contemplated that the testing phase 912 process may be employed by step 418 or step 446. It is contemplated that node 110 may first receive either simulated CIRs (i.e., step 418) or node 110 may receive CIRs from one or more of the other nodes 112-136 located within vehicle 102. The received CIRs may then be correlated with the corpus reference CIRs 922. A state of maximum correlation ($S_{max}$) is then selected using the corpus reference CIRs 922. A first likelihood vector 926 may then be generated using a column from the maximum likelihood matrix 924.

Steps 418 and 446 will then repeat the testing phase 912 process for the nodes (as shown by box 916) included within vehicle 102 to generate a second likelihood vector 928. Once the testing phase 912 has been completed for each node, steps 418 and 446 will fuse (shown by vector summation 930) all the generated likelihood vectors together (i.e., first likelihood vector 926 and second likelihood vector 928) to generate a top-K vector 932. It is contemplated that the top-K vector 932 may be the probability value of being in each state according to every node summed.

It is also contemplated that the machine learning algorithms established during the training phase 910 and testing phase 912 may be provided to a remote storage system (e.g., cloud storage). The machine learning algorithms may then be provided to other vehicles to perform vehicle state identification. It is also contemplated that vehicle 102 may likewise access and download machine learning algorithms stored on a remote storage system.

Steps 420 and 448 may then operate to extract features from the received CIRs of each node 110-1136. It is contemplated that a multipath profile may be generated at steps 420 and 448 to identify a car state from the K-shortlisted states. Steps 420 and 448 may be operable to identify a car state because a given CIR may be representative of how the environment impacts the transmitted signal. Steps 420 and 448 may be operable to determine that the CIR peaks look different when the state of the car changes because the CIR peaks represent the reflections from the environment. Steps 420 and 448 may then perform a peak-driven feature extraction to build a multi-path profile.

Figure 10:
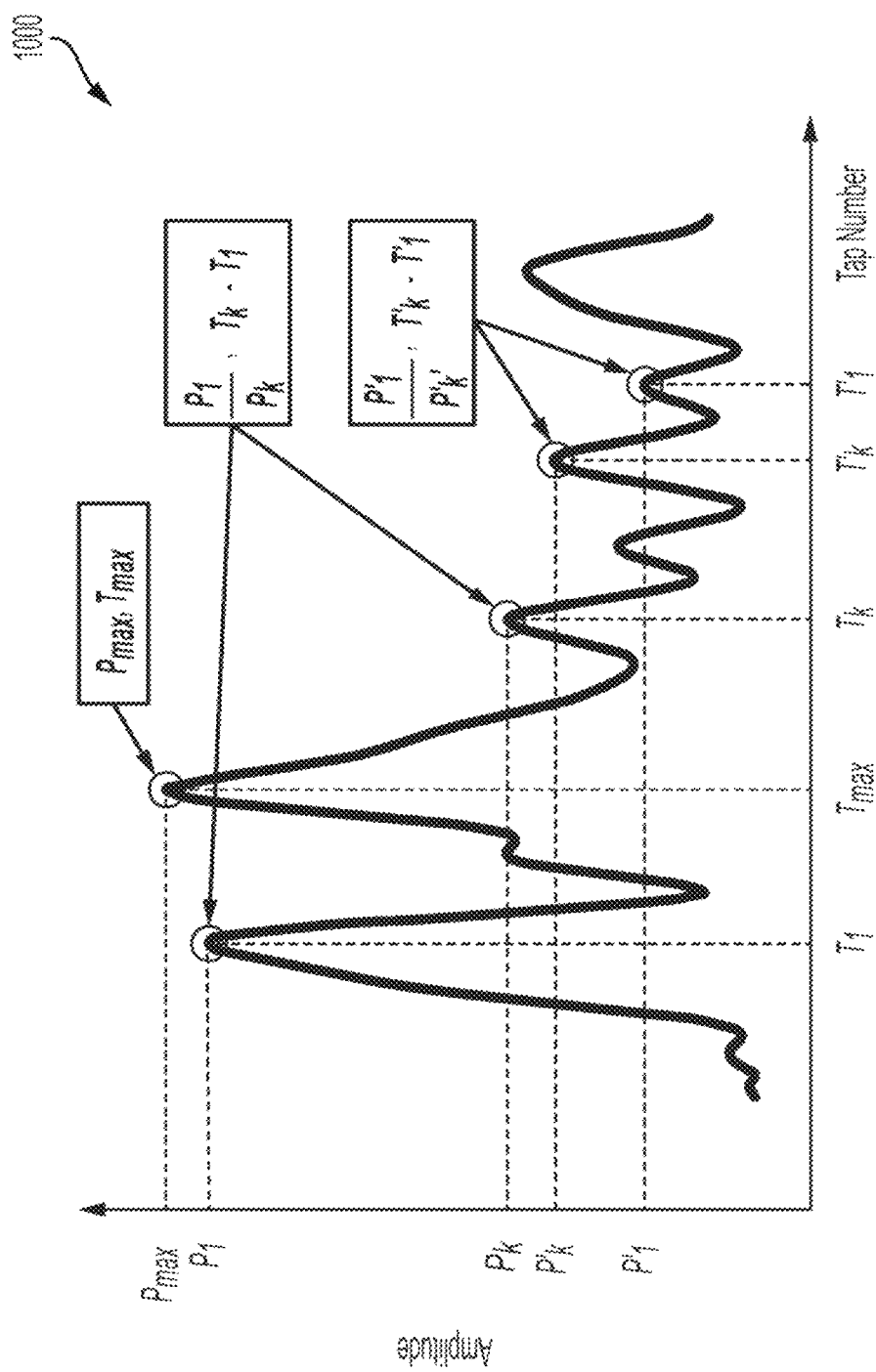
FIG. 10 is an illustrative example of the multipath profile process employed by the UWB system.

It is contemplated that steps 420 and 448 may operate to determine the peak-based features based on the position and amplitude of the CIRs. For instance, FIG. 10 illustrates a CIR that may be part of the Top-K vector 932 generated in step 418. Steps 420 and 448 may operate to determine the peak-based features for CIR by calculating: (1) the ratio of the power (amplitude) of the first peak; (2) the ratio of the power of the top peaks; (3) relative tap distance between the top peaks; (4) relative tap distance between the top peaks; (5) power of the maximum valued peak ($P_{max}$); and (6) position of the maximum valued peak ($pos(P_{max})$).

Steps 420 and 448 may operate to determine the ratio of amplitude power as follows:

$$\left(\frac{P_1}{P_2}, \frac{P_1}{P_3}, \cdots, \frac{P_1}{P_k}\right),$$

where $P_k$ refers to the $k^{th}$ peak ordered by power. The ratio of power of the top peaks may also be determined as follows:

$$\left(\frac{P'_1}{P'_2}, \frac{P'_1}{P'_3}, \cdots, \frac{P'_1}{P'_k}\right),$$

where $P'_k$ refers to the $k^{th}$ peak ordered by power. Steps 420 and 448 may also be operable to determine the relative tap distance between the first peaks as follows: $(pos(P_2)-pos(P_1), pos(P_3)-pos(P_1), \ldots, pos(P_k-pos(P_1)))$, where $pos(P_k)$ refers to the tap of the $k^{th}$ peak ordered by location. The relative tap distance between the top peaks may be determined as follows: $(pos(P'_p)-pos(P_1))$, where $pos(P'_k)$ refers to the tap of the $k^{th}$ peak sorted by power.

During the training phase 910, step 418 may reduce the correlation values obtained when a given CIR was correlated with the corpus to a single max value. Steps 420 and 448 may then be operable such that these correlation values may be used as features. Steps 420 and 448 may be operable to set $c_i^1, c_i^2, \ldots, c_i^s$ as the mean correlation value obtained by node $R_i$ by correlating the test CIR with elements of the corpus $C_i^{S_1}, C_i^{S_2}, \ldots, C_i^{S_s}$. Since the correlation values may not be in the same scale, UWB system 100 may compute a relative correlation vector as follows: $[c_i^1-c_i^1, c_i^2-c_i^1, \ldots, c_i^s-c_i^1]$. The computed relative correlation vector may be a measure of change relative to a reference state. In other words, the relative correlation vector may be the empty state. Steps 420 and 448 may then be operable to compute the features for each node 110-136 within the vehicle 102 to generate the multi-path profile.

Steps 422 and 452 may then use the multi-path profile to determine (i.e., predict) a vehicle state. It is contemplated that the resulting element feature vector may be further processed using a known classification algorithm (e.g., the Random Forest Classifier) to identify the state of the vehicle from the K short-listed states. It should be noted that a given RF signal (i.e., CIR) may be reflected by numerous types of mobile activity (e.g. by humans, robots, animals) and immobile objects situated in the environment (e.g., a house, vehicle, street). UWB system 100 may be operable to receive the reflected signals using nodes 110-136 and infer a given vehicle state.

Figure 11C:
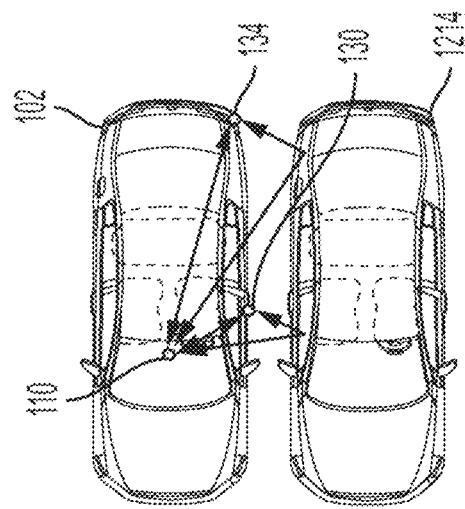
FIGS. 11A-11C are illustrative examples of the UWB system.
Figure 11B:
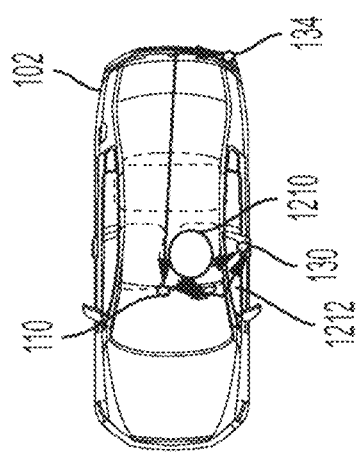
Figure 11A:
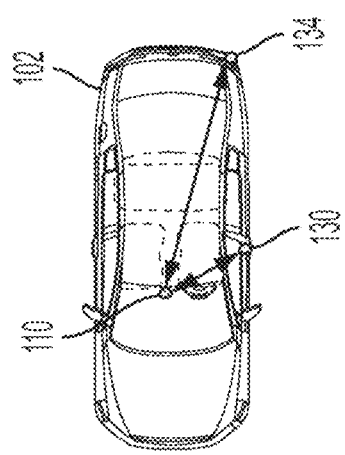

FIG. 11 illustrates several examples of how the UWB system 100 may determine a vehicle state using the process illustrated by flow diagram 400 and 430. For instance, FIG. 11A illustrates node 110, 130, and 134 may transmit and receive CIR. In this example, UWB system 100 may determine that vehicle 102 is operating in an initial static state where no obstructions exists because the CIR is operating under a line of sight (LOS) condition. In other words, UWB system 100 may determine that the CIR response times received by nodes 110, 130, and 134 indicate there is no obstruction.

In the example illustrated by FIG. 11B, nodes, 110, 130, and 134 are again transmitting and receiving CIR. In this example, however, an obstruction (e.g., a driver) may be situated in the front-driver seat. UWB system 100 may determine based on the reflected CIR 1212 and 1214 that there is a person situated in the front driver seat.

In the example illustrated by FIG. 11C, nodes, 110, 130, and 134 are again transmitting and receiving CIR. In this example, UWB system 100 may determine that there is an obstacle 1214 located near vehicle 102 based on the CIR data.

Figure 12:
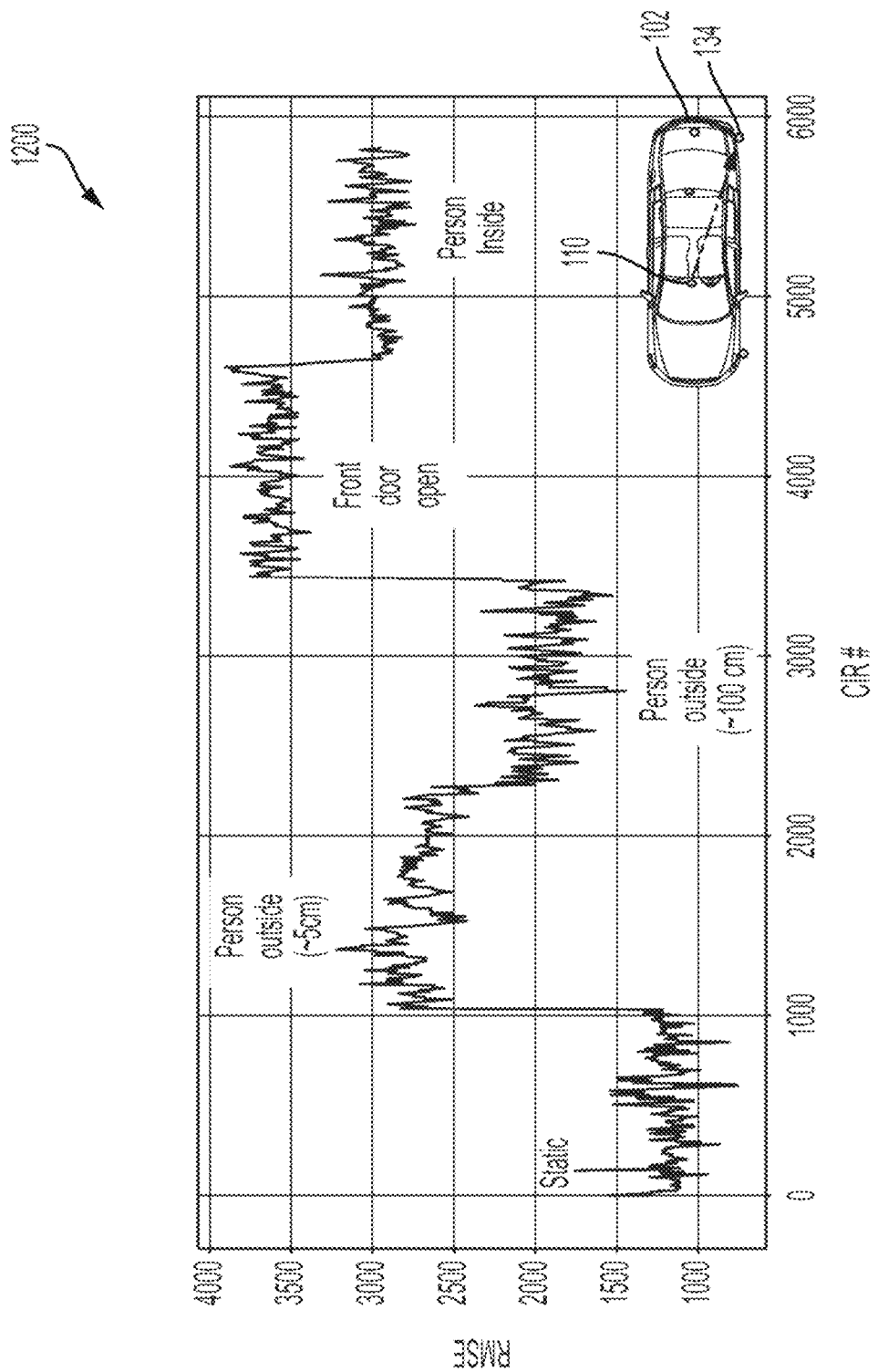
FIG. 12 is an illustrative graph of the root-mean-square energy of received CIR.

FIG. 12 is a graph 1200 illustrating the root-mean-square energy for CIR that may be transmitted by node 110 and received by node 134 during various operating states. FIG. 12 again illustrates examples of how the UWB system 100 may determine a vehicle state using the process illustrated by flow diagram 400 and 430.

With reference to FIG. 12, CIR between 0-1,000 may be used by UWB system 100 to determine the vehicle 102 is operating in a static state with no obstructions. For CIR between 1,000-2,000, the UWB system 100 may determine a person may be located approximately 5 centimeters outside the vehicle 102. For CIR between 2,500-3,500, the UWB system 100 may determine a person may be located approximately 100 centimeters outside the vehicle 102. For CIR between 3,500-4,500, the UWB system 100 may determine a front door of the vehicle 102 is open. And for CIR between 4,500-5,500, the UWB system 100 may determine a person is situated within the vehicle 102.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data, logic, and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of determining a vehicle state, the method comprising:
   receiving a UWB signal at a plurality of receiving nodes including a group of interior nodes and a group of exterior nodes wherein the group of interior nodes is calibrated to have a higher correlation than the group of exterior nodes;
   computing a plurality of channel-impulse responses (CIRs) from the UWB signal received from the plurality of receiving nodes;

generating a plurality of maximum likelihood vehicle matrices by correlating the plurality of CIRs to a corpus of reference CIRs relating to a plurality of vehicle states; and determining the vehicle state by summing the plurality of maximum likelihood vehicle matrices.

2. The method of claim 1, wherein the vehicle state includes determining whether a user is situated within a vehicle.

3. The method of claim 1, wherein the vehicle state includes determining a state of a vehicle window and door.

4. The method of claim 1, further comprising:
upsampling the plurality of CIRs; and
aligning the plurality of CIRs by shifting a first path within one of the plurality of CIRs to a reference tap.

5. The method of claim 4, wherein the plurality of CIRs are upsampled using a Fast Fourier Transformation (FFT) algorithm that operates on a time domain of one of the plurality of CIRs.

6. The method of claim 1, wherein the maximum likelihood vehicle matrices are generated during a machine learning process that includes a training phase and testing phase.

7. The method of claim 1, wherein the UWB signal includes a symbol represented by:

$$s(t) = \sqrt{E_p} * \Sigma_{j=0}^{N_f-1} b_j \omega(t - jT_f - C_j T_c) \quad \text{(Equation 1)}$$

where $\omega(t)$ is a UWB pulse of duration $T_p$, $T_f$ is a duration of a given frame of the symbol divided into $N_f$ frames, $b_j$ is a polarity code, $c_j$ is a hopping sequence, $T_c$ is a chirp duration, and $E_p$ is an energy of the symbol.

8. The method of claim 1, wherein one of the plurality of receiving nodes is designated as a tag node and each of the remaining receiving nodes is designated as a slave node, the tag node operating as a transmitter and the slave nodes operating as receivers, and the tag node using round-robin network communication with the slave nodes.

9. A method of determining a vehicle state, the method comprising:
generating a machine learning classification algorithm;
receiving a UWB signal at a plurality of receiving nodes the plurality of receiving nodes including a group of interior nodes and a group of exterior nodes such that the group of interior nodes is calibrated to have a higher correlation than the group of exterior nodes;
computing a plurality of channel-impulse responses (CIRs) from the UWB signal received from the plurality of receiving nodes;
extracting from the plurality of CIRs a plurality of peak-based features based on a selected position and amplitude; and generating a plurality of correlation-based features by correlating the plurality of CIRs to a corpus of reference CIRs relating to a plurality of vehicle states; and
determining the vehicle state by processing the plurality of peak-based features and correlation-based features using the machine learning classification algorithm.

10. The method of claim 9, further comprising:
generating a plurality of maximum likelihood vehicle matrices by correlating the plurality of CIRs to the corpus of reference CIRs relating to the plurality of vehicle states; and summing the plurality of maximum likelihood vehicle matrices to generate a top-K vehicle state matrix; and
determining the vehicle state by processing the plurality of peak-based features and correlation-based features using the machine learning classification algorithm within the top-K vehicle state matrix.

11. The method of claim 9, wherein the one or more peak-based features may be determined based on a ratio of power of a first peak or a top peak of the plurality of CIRs.

12. The method of claim 9, wherein the one or more peak-based features may be determined based on a relative tap distance between a first peak or a top peak of the plurality of CIRs.

13. The method of claim 9, wherein the one or more peak-based features may be determined based on a maximum peak power of the plurality of CIRs.

14. The method of claim 13, wherein the one or more peak-based features may be determined based on a position of the maximum peak power of the plurality of CIRs.

15. The method of claim 9, wherein the machine learning classification algorithm is a Random Forest classifier.

16. The method of claim 9, further comprising:
upsampling the plurality of CIRs; and
aligning the plurality of CIRs by shifting a first path within one of the plurality of CIRs to a reference tap.

17. The method of claim 16, wherein the first path is identified as an event that occurs in the plurality of CIRs.

18. The method of claim 9, wherein the plurality of receiving nodes is fixed on the vehicle and one or more of the plurality of receiving nodes is subject to location changes.

19. A system operable to determine a vehicle state, the system comprising:
a transmitting node operable to transmit an ultra-wide band (UWB) signal;
a plurality of receiving nodes operable to receive the UWB signal transmitted by the transmitting node, the plurality of receiving nodes including a group of interior nodes and a group of exterior nodes wherein the group of interior nodes is calibrated to have a higher correlation than the group of exterior nodes;
a controller in communication with the transmitting node and the plurality of receiving nodes, wherein the controller is operable to:
receive a UWB signal at a plurality of receiving nodes;
compute a plurality of channel-impulse responses (CIRs) from the UWB signal received from the plurality of receiving nodes;
generate a plurality of maximum likelihood vehicle matrices by correlating the plurality of CIRs to a corpus of reference CIRs relating to a plurality of vehicle states; and
determine the vehicle state by summing the plurality of maximum likelihood vehicle matrices.

20. The system of claim 19, wherein the controller is further operable to align the plurality of CIRs by identifying an event that occurs in the plurality of CIRs independent of an environment.

* * * * *